(12) United States Patent
Song et al.

(10) Patent No.: US 7,613,475 B2
(45) Date of Patent: Nov. 3, 2009

(54) SYSTEM OF WIRELESS LOCAL AREA NETWORK BASED ON TRANSMIT POWER CONTROL AND METHOD FOR CONTROLLING TRANSMIT POWER

(75) Inventors: Hak-Hoon Song, Seoul (KR); Nak-Koo Kim, Seongnam-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 741 days.

(21) Appl. No.: 11/010,321

(22) Filed: Dec. 14, 2004

(65) Prior Publication Data
US 2005/0250528 A1 Nov. 10, 2005

(30) Foreign Application Priority Data
Apr. 16, 2004 (KR) .................... 10-2004-0026356

(51) Int. Cl.
*H04B 7/005* (2006.01)
(52) U.S. Cl. .................. 455/522; 370/338; 455/574
(58) Field of Classification Search .............. 370/278, 370/328, 338, 208, 342; 455/437, 522, 355
See application file for complete search history.

(56) References Cited

U.S. PATENT DOCUMENTS

| | | | |
|---|---|---|---|
| 5,844,900 A | 12/1998 | Hong et al. | |
| 6,226,277 B1 | 5/2001 | Chuah | |
| 6,285,665 B1 | 9/2001 | Chuah | |
| 6,377,548 B1 | 4/2002 | Chuah | |
| 6,469,991 B1 | 10/2002 | Chuah | |
| 6,567,416 B1 | 5/2003 | Chuah | |
| 6,587,034 B1* | 7/2003 | Heiman et al. ............. | 340/7.55 |
| 6,842,605 B1* | 1/2005 | Lappetelainen et al. .... | 455/13.4 |
| 6,850,499 B2* | 2/2005 | Wheatley et al. ............ | 370/328 |
| 6,983,167 B2* | 1/2006 | Adachi et al. ............... | 455/522 |
| 6,993,358 B2* | 1/2006 | Shiotsu et al. ........... | 455/552.1 |
| 7,006,483 B2* | 2/2006 | Nelson et al. ............... | 370/342 |
| 7,047,009 B2* | 5/2006 | Laroia et al. ................ | 455/437 |
| 7,054,296 B1* | 5/2006 | Sorrells et al. .............. | 370/338 |

(Continued)

*Primary Examiner*—Thong H Vu
(74) *Attorney, Agent, or Firm*—Robert E. Bushnell, Esq.

(57) ABSTRACT

A system of a wireless local area network (LAN) based on transmit power control comprises: an access point (AP) for broadcasting a beacon frame to an area that is outside a service coverage of a first transmit power by using a second transmit power higher than the first transmit power already set when it reaches a set period, and for increasing the first transmit power if there is a request for increase of the first transmit power based on the beacon frame broadcast by the second transmit power; and a station which requests an increase in the first transmit power on the basis of the received beacon frame so as to enable the station to have an association with the AP. The increase is requested when the station receives the beacon frame broadcast from the AP with the second transmit power when the station is outside the service coverage of the first transmit power. The AP periodically transmits a strong beacon frame having local maximum transmit power (LMTP), and then provides a station existing outside the transmit power coverage of a current AP with basic service set (BSS) information. In this way, a newly approaching station can be provided with a basis for associating and communicating with the BSS with ease.

29 Claims, 8 Drawing Sheets

U.S. PATENT DOCUMENTS

| | | | | |
|---|---|---|---|---|
| 7,245,946 | B2* | 7/2007 | Liu | 455/574 |
| 7,251,232 | B1* | 7/2007 | Meier | 370/338 |
| 7,308,279 | B1* | 12/2007 | Zweig | 455/522 |
| 7,333,460 | B2* | 2/2008 | Vaisanen et al. | 370/338 |
| 7,415,262 | B2* | 8/2008 | Liu et al. | 455/318 |
| 2003/0053480 | A1* | 3/2003 | Jang et al. | 370/445 |
| 2003/0107512 | A1* | 6/2003 | McFarland et al. | 342/159 |
| 2004/0022222 | A1* | 2/2004 | Clisham | 370/338 |
| 2004/0039817 | A1* | 2/2004 | Lee et al. | 709/225 |
| 2004/0090929 | A1* | 5/2004 | Laux et al. | 370/311 |
| 2004/0147223 | A1* | 7/2004 | Cho | 455/41.2 |
| 2004/0151109 | A1* | 8/2004 | Batra et al. | 370/208 |
| 2004/0259542 | A1* | 12/2004 | Viitamaki et al. | 455/426.2 |
| 2005/0003794 | A1* | 1/2005 | Liu | 455/355 |
| 2005/0048972 | A1* | 3/2005 | Dorenbosch et al. | 455/436 |
| 2005/0068928 | A1* | 3/2005 | Smith et al. | 370/338 |
| 2005/0135249 | A1* | 6/2005 | Cromer et al. | 370/235 |
| 2005/0135284 | A1* | 6/2005 | Nanda et al. | 370/294 |
| 2005/0143119 | A1* | 6/2005 | Chandra et al. | 455/522 |
| 2005/0152320 | A1* | 7/2005 | Marinier et al. | 370/338 |
| 2005/0213532 | A1* | 9/2005 | Liu et al. | 370/328 |
| 2007/0155314 | A1* | 7/2007 | Mohebbi | 455/11.1 |

* cited by examiner

FIG. 3

| ORDER | INFORMATION |
|---|---|
| 1 | TIMESTAMP |
| 2 | BEACON INTERVAL |
| 3 | CAPABILITY INFORMATION |
| 4 | SSID |
| 5 | SUPPORRED RATES |
| 6 | FH PARAMETER SET |
| 7 | DS PARAMETER SET |
| 8 | CF PARAMETER SET |
| 9 | TIM |
| 11 | COUNTRY |
| 14 | POWER CONSTRAINT |
| 15 | CHANNEL SWITCH ANNOUNCEMENT |
| 16 | QUIET |
| 17 | IBSS DFS |
| 18 | TPC REPORT |

FIG. 4

| CATEGORY | ACTION | DIALOG TOKEN | TPC REQUEST ELEMENT |
|---|---|---|---|

OCTETS :    1           1           1           4

TPC REQUEST FRAME

| CATEGORY | ACTION | DIALOG TOKEN | TPC REPORT ELEMENT |
|---|---|---|---|

OCTETS:    1           1           1           4

TPC REPORT FRAME

| CATEGORY | ACTION | TPC REPORT ELEMENT |
|---|---|---|
| 1 | 1 | 4 |

OCTETS:

SYSTEM OF WIRELESS LOCAL AREA NETWORK BASED ON TRANSMIT POWER CONTROL AND METHOD FOR CONTROLLING TRANSMIT POWER

CLAIM OF PRIORITY

This application makes reference to, incorporates the same herein, and claims all benefits accruing under 35 U.S.C. §119 from an application for SYSTEM OF WIRELESS LOCAL AREA NETWORK BASED ON TRANSMIT POWER CONTROL AND METHOD FOR CONTROLLING TRANSMIT POWER earlier filed in the Korean Intellectual Property Office on 16 Apr. 2004 and there duly assigned Ser. No. 2004-26356.

BACKGROUND OF THE INVENTION

1. Technical Field

The present invention relates to a system of a wireless local area network (LAN) and, more specifically, to a system of a wireless LAN based on transmit power control, and to a method for controlling transmit power in a wireless LAN. In accordance with the invention, the transmit power control is performed between an access point (AP), which is the base of a wireless LAN system based on transmit power control, and a station so that stations that are outside a basic service set (BSS) area can be associated with the BSS.

2. Related Art

A local area network (LAN) can, in general, be divided into a wired LAN and a wireless LAN. The particular type is determined according to whether or not there is a cable.

The wireless LAN is a scheme for performing communication in a network using a radio wave rather than cable. The wireless LAN emerged as an alternative for solving difficulties of installation, maintenance and movement of communication equipment due to cabling, and its use is on the increase since the number of mobile users is increasing.

A wireless LAN comprises an access point (AP) and a wireless LAN card. The AP is a device that sends a radio wave to enable wireless LAN users within the transmission distance or range to have access to the Internet or to perform networking, and it acts as a base station for a mobile phone or a hub of a wired network. An AP device is also installed in the service area of a wireless ultra high-speed Internet service provided by an Internet Service Provider (ISP).

The user has to install a wireless LAN card in a station, such as a notebook computer (PC) or a PDA, in order to perform wireless network communication. Such a wireless LAN station is normally referred to, and is hereinafter referred to, as a station (STA).

IEEE 802.11 sets forth a currently widely used wireless LAN standard: "Standard for Information Technology-Telecommunications and Information Exchange between Systems-Local and Metropolitan Area Networks-Specific Requirements-Part 11: Wireless LAN Medium Access Control (MAC) and Physical Layer (PHY) Specifications" (1999 Edition).

The IEEE 802.11 standard defines a rule for a physical layer and a medium access control (MAC) layer which make up the wireless LAN.

The MAC layer defines an order and a regulation that should be observed when a station or an apparatus that uses a shared medium uses a medium or has access to the medium, and enables the station or apparatus to efficiently use the capacity of the medium.

A wireless LAN based on the 802.11 MAC and the IEEE 802.11a/b/g PHY has spread to homes and offices, and has become quite popular.

The IEEE 802.11 standard contentiously occupies a wireless channel to provide communication using a carrier sense multiple access with collision avoidance (CSMA/CA) scheme. In this regard, the intensity of the transmitting radio wave which uses the wireless channel is permitted when it satisfies the regulatory maximum transmit power which each nation regulates. As to Korea, for example, each channel cannot exceed 200 mW. There are also regulations for each frequency in the United States and in the European countries.

Transmit power of an AP and transmit power of stations are set in accordance with respective regulatory transmit power maximums. In Europe, however, it is compulsory that a transmit power control (TPC) function and a dynamic frequency selection (DFS) function be used when the IEEE 802.11a standard is used on a band of 5 GHz in order to protect radar or communication satellites, and IEEE 802.11h TG functions to establish such technical regulation.

TPC is a technology that protects radar or communication satellites by controlling the intensity of the transmission power so that only a required amount of power is used. DFS is a technology that changes the channel of the WLAN to another frequency band in order to protect the existing system, most preferably in cases where a radar signal or a communication satellite signal is detected.

Besides providing the advantage of protecting radar and communication satellites, TPC provides another advantage in that it can control the output of the AP and dynamically change the service area of the BSS so that electronic wave interference between BSSs can be reduced, and electronic resources can be efficiently controlled. In addition, power consumption of the station can be reduced so that batteries can be used for a longer period of time.

The wireless LAN system having transmit power control can operate in three transmit power ranges: regulatory maximum transmit power (RMTP), local maximum transmit power (LMTP), and current transmit power (CTP).

LMTP is the maximum transmit power used in the BSS, and it is different from RMTP, which is nationally regulated.

LMTP is set to a value less than that of RMTP. It is used to protect another radio wave sharing system by limiting the maximum output of the BSS. In reality, the current transmit power (CTP) used in the AP and in the station is set to a value equal to or less than the LMTP.

Transmit power control methods proposed in IEEE 802.11h/D3.0 can be divided into a method using a beacon and a probe response and a method using a TPC request and a TPC report.

The transmit power control method using a beacon and a probe response will be explained first.

The IEEE 802.11h/D3 has several elements in addition to a beacon frame body and a probe response frame body, as defined in the 802.11 MAC, in order to realize TPC and DFS.

A country element enables the WLAN to roam internationally by providing each country with automatic knowledge of a regulation of transmit power in each frequency band through the beacon frame. A power constraint element is used to specify the LMTP, and its expression is as follows:

$$LMTP = RMTP - \text{Power Constraint}$$

Accordingly, a station can recognize the maximum transmit power to be transmitted in the BSS using a beacon frame received from the AP. A TPC report element is an element for recording information on transmit power used by the AP when the AP transmits the beacon frame. The station realizes how much transmit power is needed when the station transmits the beacon frame to the AP using the TPC report element received from the AP.

That is, path loss in a channel can be calculated by comparing the reception power of the signal received by the station with the transmit power on the beacon frame recorded by the AP, and the power that the station transmits to the AP can be determined based on the path loss.

Path loss can be expressed by the following mathematical expression:

> Path loss of a channel=Transmit power of *AP*–Reception power of beacon frame received from station Next, a method for controlling transmit power using a TPC request frame and a TPC report frame will be explained.

When a station moves in the BSS, each station has to update transmit power. The stations can update transmit power using the beacon frame that is periodically received from the AP. However, the AP has to use another kind of mechanism since it cannot update transmit power.

The AP requests a station to give updated information by transmitting a TPC request frame, and the station calculates the reception power using the received TPC request frame, and then transmits link margin information in a current position and power information that is transmitted to the AP by the station using the TPC report frame.

In the latter regard, the link margin is the difference between the reception power and the minimum reception power required for a given data rate, which is expressed as follows:

> Link margin=Reception power of *TPC* request frame–Minimum reception power required for data rate of *TPC* request frame The AP can obtain information from various stations in the BSS through the TPC report frame, and all stations can receive the frame transmitted by the AP by determining the transmit power on the basis of the station having the minimum link margin or the station having the minimum reception power of the TPC report frame among the various stations.

The TPC request frame has a Category, an Action, a Dialog Token, and a TPC Request element, and the TPC report frame has a Category, an Action, a Dialog Token, and a TPC Report element.

The WLAN system, to which such transmit power control is applied, can reduce interference with radar or a communication satellite which shares a frequency in the 5 GHz band, in comparison to the WLAN system to which the transmit power control is not applied, and interferes with another BSS to a small extent when the BSS lies adjacent to the WLAN system. Also, there are advantages in that the usage efficiency of electronic wave resources may increase by reducing a radius of the BSS, and the usage time of a battery may increase by reducing the power consumption of the station.

However, since the IEEE 802.11 WLAN tries to approach the medium using the CSMA/CA method, there are defects that necessarily occur in the WLAN system to which the TPC is applied. One of them relates to a hidden node.

Stations (STA) can communicate with the AP, but they cannot communicate with each other. Accordingly, many collisions in channel contention may occur since each STA cannot properly recognize whether or not the medium is occupied. Also, a problem occurs even when the STA wishes to make an association with the BSS. In the case where a STA existing within a current transmit power range of the AP wishes to make an association, there is no problem since the corresponding STA can communicate with the AP itself.

However, in the case where the STA exists in the LMTP of the AP but is outside the current transmit power coverage, a problem occurs because an advance procedure for the association cannot be properly performed.

While a STA has to recognize information on the BSS in order to make an association with the BSS, the STA cannot properly receive a beacon frame transmitted from the AP when the STA exists in the LMTP range but is outside the current transmit power range. Even though the STA recognizes the information as to the BSS, there is a problem in that it is difficult to form a link for communication since the AP does not recognize information as to the STA.

The following patents are considered to be generally pertinent to the present invention, but are burdened by the disadvantages set forth above: U.S. Pat. No. 6,567,416 to Chuah, entitled METHOD FOR ACCESS CONTROL IN A MULTIPLE ACCESS SYSTEM FOR COMMUNICATIONS NETWORKS, issued on May 20, 2003; U.S. Pat. No. 6,377,548 to Chuah, entitled METHOD FOR ADMITTING NEW CONNECTIONS BASED ON MEASURED QUANTITIES IN A MULTIPLE ACCESS SYSTEM FOR COMMUNICATIONS NETWORKS, issued on Apr. 23,2002; U.S. Pat. No. 6,285,665 to Chuah, entitled METHOD FOR ESTABLISHMENT OF THE POWER LEVEL FOR UPLINK DATA TRANSMISSION IN A MULTIPLE ACCESS SYSTEM FOR COMMUNICATIONS NETWORKS, issued on Sep. 4, 2001; U.S. Pat. No. 6,469,991 to Chuah, entitled METHOD FOR OVERLOAD CONTROL IN A MULTIPLE ACCESS SYSTEM FOR COMMUNICATION NETWORKS, issued on Oct. 22, 2002; U.S. Pat. No. 5,844,900 to Hong et al., entitled METHOD AND APPARATUS FOR OPTIMIZING A MEDIUM ACCESS CONTROL PROTOCOL, issued on Dec. 1, 1998; and U.S. Pat. No. 6,226,277 to Chuah, entitled METHOD FOR ADMITTING NEW CONNECTIONS BASED ON USAGE PRIORITIES IN A MULTIPLE ACCESS SYSTEM FOR COMMUNICATIONS NETWORKS, issued on May 1, 2001.

SUMMARY OF THE INVENTION

It is an objective of the present invention to provide a wireless LAN system which is based on transmit power control, and a method for controlling its transmit power, wherein an AP and a station control the transmit power themselves, and form a link in order that the station can make a new association with a basic service set (BSS) in the WLAN system based on transmit power control.

According to an aspect of the present invention, there is provided a wireless LAN system based on transmit power control, comprising: an AP for broadcasting a beacon frame to an area that is outside a service coverage of first transmit power by using a second transmit power, higher than the first transmit power, already set when it reaches a set period, and for increasing the first transmit power when there is a request for increase of the first transmit power based on the beacon frame broadcast by the second transmit power; and a station for requesting an increase in the first transmit power on the basis of the received beacon frame so as to make an association with the AP when receiving the beacon frame broadcast from the AP with the second transmit power in a state that is outside the service coverage of the first transmit power.

According to another aspect of the present invention, there is provided a method for controlling transmit power of an AP, the method comprising the steps of: broadcasting a beacon frame to an area that is outside the service coverage for a first transmit power by using a second transmit power higher than the first transmit power, already set when it reaches a set period; and increasing the first transmit power when stations that are outside the service coverage of the first transmit power receive the beacon frame broadcast by means of the second transmit power, and request an increase in first transmit power in order to make an association with the AP.

According to yet another aspect of the present invention, there is provided a method for controlling transmit power of a station in a wireless LAN system, the method comprising the steps of: requesting an increase in the first transmit power on the basis of a beacon frame received to make an association with an AP when a beacon frame broadcast with second transmit power, higher than the first transmit power, is received from the AP in a state of association with the AP outside a service coverage of the first transmit power of the AP; and forming a link to the AP that transmits the frame with the increased first transmit power so as to perform a new association with the AP.

According to yet another aspect of the present invention, there is provided a wireless LAN system based on transmit power control, comprising: an AP for transmitting Basic Service Set (BSS) information to an area that is outside a service coverage for a first transmit power by using a second transmit power, higher than first transmit power, already set when it reaches a set period, and for increasing the first transmit power when there is a request for increase of the first transmit power based on the BSS information transmitted by means of the second transmit power; and a station for requesting the increase in the first transmit power on the basis of the received BSS information so as to make an association with the AP when receiving the BSS information transmitted from the AP by means of the second transmit power when the BSS information is outside the service coverage for the first transmit power.

According to yet another aspect of the present invention, there is provided a method for controlling transmit power of an AP, the method comprising the steps of: transmitting basic service set (BSS) information to an area that is outside a service coverage for a first transmit power by using a second transmit power, higher than the first transmit power, already set when it reaches a set period; and increasing the first transmit power when stations in the area outside the service coverage for the first transmit power receive the BSS information transmitted by means of the second transmit power, and request the increase in the first transmit power in order to make an association with the AP.

According to yet another aspect of the present invention, there is provided a method for controlling transmit power of a station in a wireless LAN system based on transmit power control, comprising the steps of: requesting an increase in first transmit power on the basis of basic service set (BSS) information received in order to make an association with an AP, when receiving the BSS information transmitted by means of second transmit power, higher than the first transmit power, from the AP when a station is outside a service coverage for the first transmit power of the AP, and is not associated with the AP; and forming a link to the AP that transmits a frame with the increased first transmit power and performing a new association with the AP.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a diagram showing the structure of a beacon frame proposed in IEEE 802.11h/D3.0;

FIG. 4 is a diagram showing the structure of a TPC request frame and a TPC report frame proposed in IEEE 802.11h/D3.0;

DETAILED DESCRIPTION OF THE INVENTION

Figure 1:
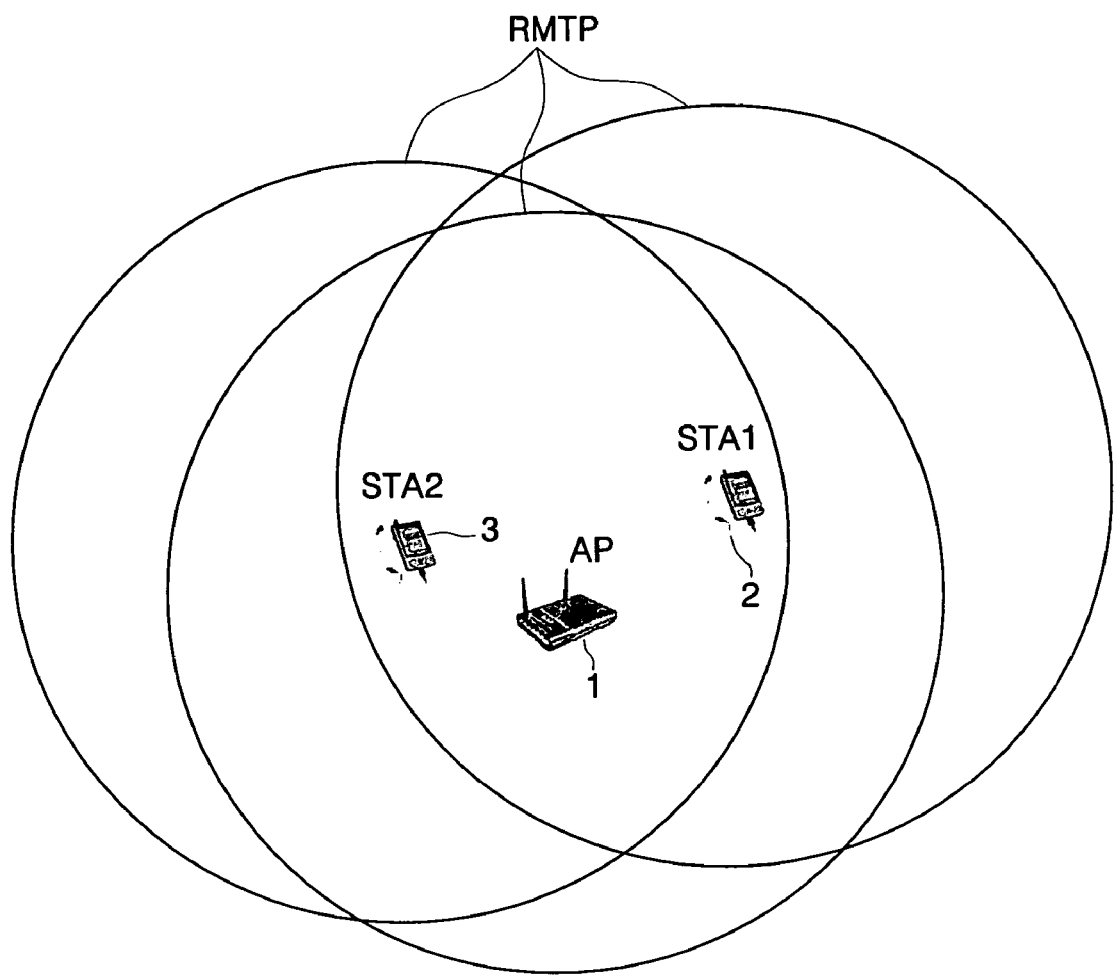
FIG. 1 is a diagram of a conventional wireless LAN system.

Hereinafter, the present invention will be explained with reference to the accompanying drawings;

FIG. 1 is a diagram of a conventional wireless LAN system. As shown in FIG. 1, transmit power of an AP 1 and transmit power of stations (STA1, STA2) 2 and 3 are set in accordance with respective regulatory transmit power maximums.

In Europe, however, it is compulsory that a transmit power control (TPC) function and a dynamic frequency selection (DFS) function be used when the IEEE 802.11a standard is used on a band of 5 GHz in order to protect radar or communication satellites, and IEEE 802.11h TG functions to establish such technical regulation.

TPC is a technology that protects radar or communication satellites by controlling the intensity of the transmission power so that only a required amount of power is used. DFS is a technology that changes the channel of the WLAN to another frequency band in order to protect the existing system, most preferably in cases where a radar signal or a communication satellite signal is detected.

Besides providing the advantage of protecting radar and communication satellites, TPC provides another advantage in that it can control the output of the AP and dynamically change the service area of the BSS so that electronic wave interference between BSSs can be reduced, and electronic resources can be efficiently controlled. In addition, power consumption of the station can be reduced so that batteries can be used for a longer period of time.

Figure 2:
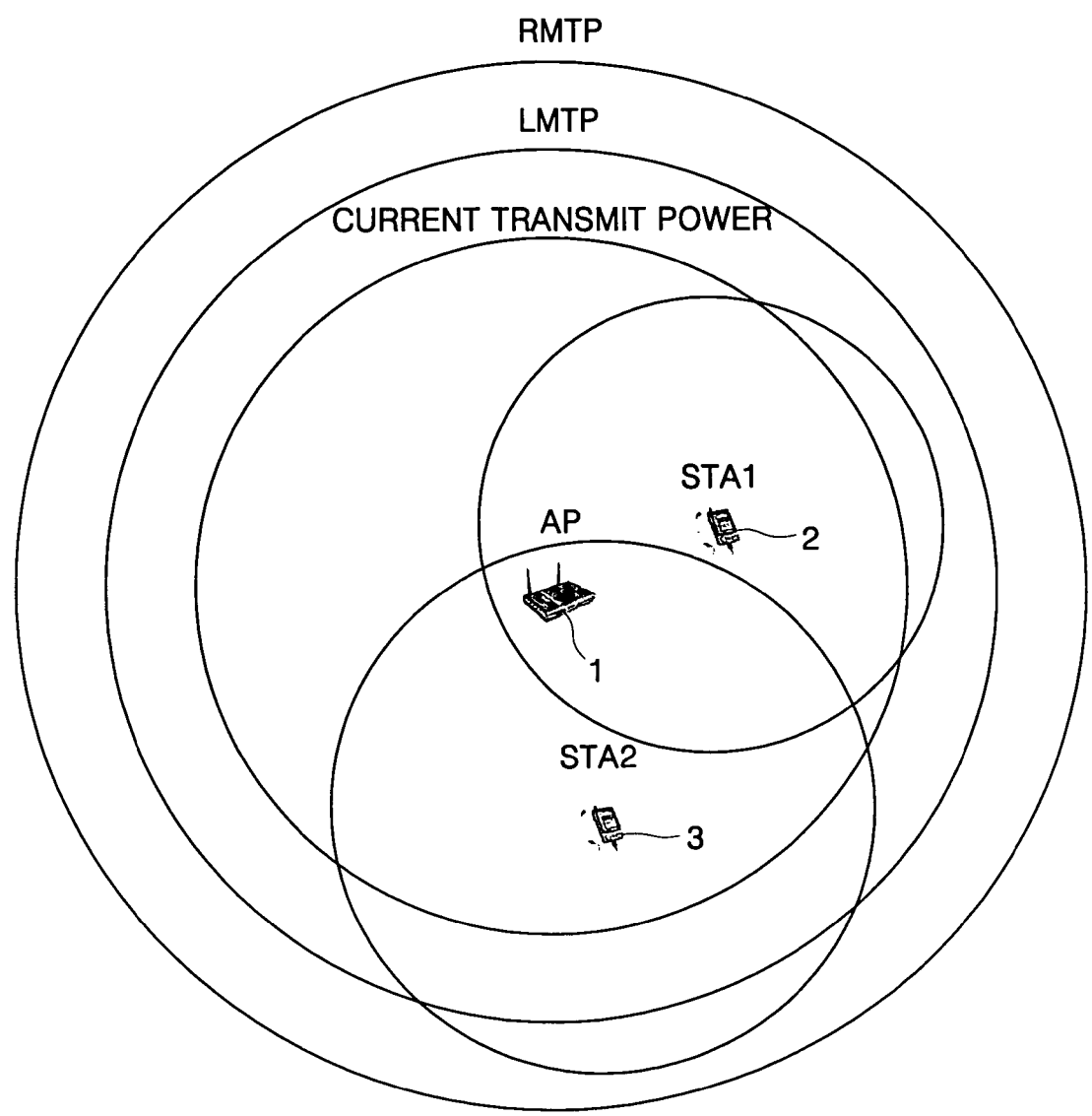
FIG. 2 is a diagram of a wireless LAN system applying transmit power control of the conventional art.

FIG. 2 is a diagram of a wireless LAN system applying transmit power control of the conventional art.

Referring to FIG. 2, the wireless LAN system having transmit power control can operate in three transmit power ranges: regulatory maximum transmit power (RMTP), local maximum transmit power (LMTP), and current transmit power (CTP).

LMTP is the maximum transmit power used in the BSS, and it is different from RMTP which is nationally regulated.

LMTP is set to a value less than that of RMTP. It is used to protect another radio wave sharing system by limiting the maximum output of the BSS. In reality, the current transmit power (CTP) used in the AP and in the station is set to a value equal to or less than the LMTP.

Transmit power control methods proposed in IEEE 802.11h/D3.0 can be divided into a method using a beacon and a probe response, and a method using a TPC request and a TPC report.

The transmit power control method using a beacon and a probe response will be explained first.

The IEEE 802.11h/D3 has several elements in addition to a beacon frame body and a probe response frame body, as defined in the 802.11 MAC, in order to realize TPC and DFS.

FIG. 3 is a diagram showing the structure of a beacon frame proposed in IEEE 802.11h/D3.0. As shown in FIG. 3, numbers 1 to 9 denote elements of beacon frames specified in the IEEE 802.11 MAC, number 11 is specified in the IEEE 802.11d, and remaining numbers 14 to 18 denote elements specified in the IEEE 802.11h.

The country element, denoted as number 11, enables the WLAN to roam internationally by providing each country with automatic knowledge of a regulation of transmit power in each frequency band through the beacon frame. The power constraint element, denoted as number 14, is used to specify the LMTP, and its expression is as follows:

$$LMTP = RMTP - \text{Power Constraint}$$

Accordingly, a station can recognize the maximum transmit power to be transmitted in the BSS using a beacon frame received from the AP. The TPC report element, denoted as number 18, is an element for recording information on transmit power used by the AP when the AP transmits the beacon frame. The station realizes how much transmit power is needed when the station transmits the beacon frame to the AP using the TPC report element received from the AP.

That is, path loss in a channel can be calculated by comparing the reception power of the signal received by the station with the transmit power on the beacon frame recorded by the AP, and the power that the station transmits to the AP can be determined based on the path loss.

Path loss can be expressed by the following mathematical expression:

$$\text{Path loss of a channel} = \text{Transmit power of } AP - \text{Reception power of beacon frame received from station}$$

Next, a method for controlling transmit power using the TPC request frame and the TPC report frame will be explained.

When a station moves in the BSS, each station has to update transmit power. The stations can update transmit power using the beacon frame that is periodically received from the AP. However, the AP has to use another kind of mechanism since it cannot update transmit power.

The AP requests a station to give updated information by transmitting the TPC request frame, and the station calculates the reception power using the received TPC request frame, and then transmits link margin information in a current position and power information that is transmitted to the AP by the station using the TPC report frame.

In the latter regard, the link margin is the difference between the reception power and the minimum reception power required for a given data rate, which is expressed as follows:

$$\text{Link margin} = \text{Reception power of } TPC \text{ request frame} - \text{Minimum reception power required for data rate of } TPC \text{ request frame}$$

The AP can obtain information from various stations in the BSS through the TPC report frame, and all stations can receive the frame transmitted by the AP by determining the transmit power on the basis of the station having the minimum link margin or the station having the minimum reception power of the TPC report frame among the various stations.

FIG. 4 is a diagram showing the structure of a TPC request frame and a TPC report frame proposed in IEEE 802.11h/D3.0.

Referring to FIG. 4, the TPC request frame has a Category, an Action, a Dialog Token, and a TPC Request element, and the TPC report frame has a Category, an Action, a Dialog Token, and a TPC Report element.

The WLAN system, to which such transmit power control is applied, can reduce interference with radar or a communication satellite which shares a frequency in the 5 GHz band, in comparison to the WLAN system to which the transmit power control is not applied, and interferes with another BSS to a small extent when the BSS lies adjacent to the WLAN system. Also, there are advantages in that the usage efficiency of electronic wave resources may increase by reducing a radius of the BSS, and the usage time of a battery may increase by reducing the power consumption of the station.

However, since the IEEE 802.11 WLAN tries to approach the medium using the CSMA/CA method, there are defects that necessarily occur in the WLAN system to which the TPC is applied. One of them relates to a hidden node.

Figure 5:
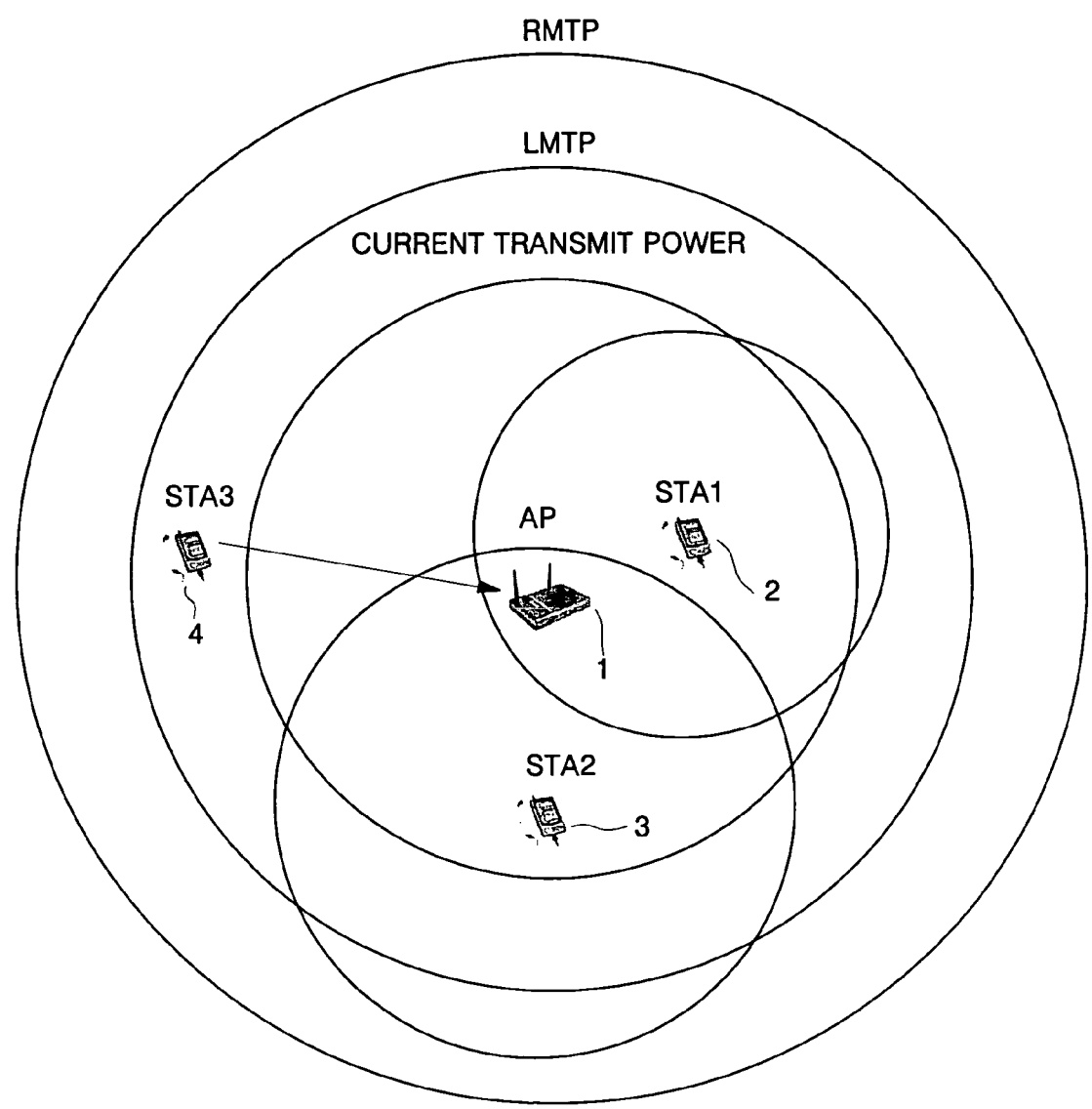
FIG. 5 is a diagram showing a station that is outside a current transmit power coverage even though the station is in an LMTP coverage of a conventional AP.

Referring to FIG. 2, the STA1 2 and STA2 3 can communicate with the AP 1 well, but they cannot communicate with each other. Accordingly, many collisions in channel contention may occur since each station cannot properly recognize whether or not the medium is occupied. Also, a problem occurs even when the station wishes to make an association with the BSS. In the case where a station existing within a current transmit power range of the AP wishes to make an association, there is no problem since the corresponding station can communicate with the AP itself. However, as shown in FIG. 5, which is a diagram showing a station that is outside a current transmit power coverage even though the station is in an LTMP coverage, in the case where the STA3 4 exists in the LMTP of the AP 1 but is outside the current transmit power coverage, a problem occurs because an advance procedure for the association cannot be properly performed.

While a station has to recognize information on the BSS in order to make an association with the BSS, the STA3 4 cannot properly receive a beacon frame transmitted from the AP 1 when the STA3 4 is in the LMTP range but is outside the current transmit power range. Even though the STA3 4 recognizes the information as to the BSS, there is a problem in that it is difficult to form a link for communication since the AP 1 does not recognize information as to the STA3 4.

Figure 6:
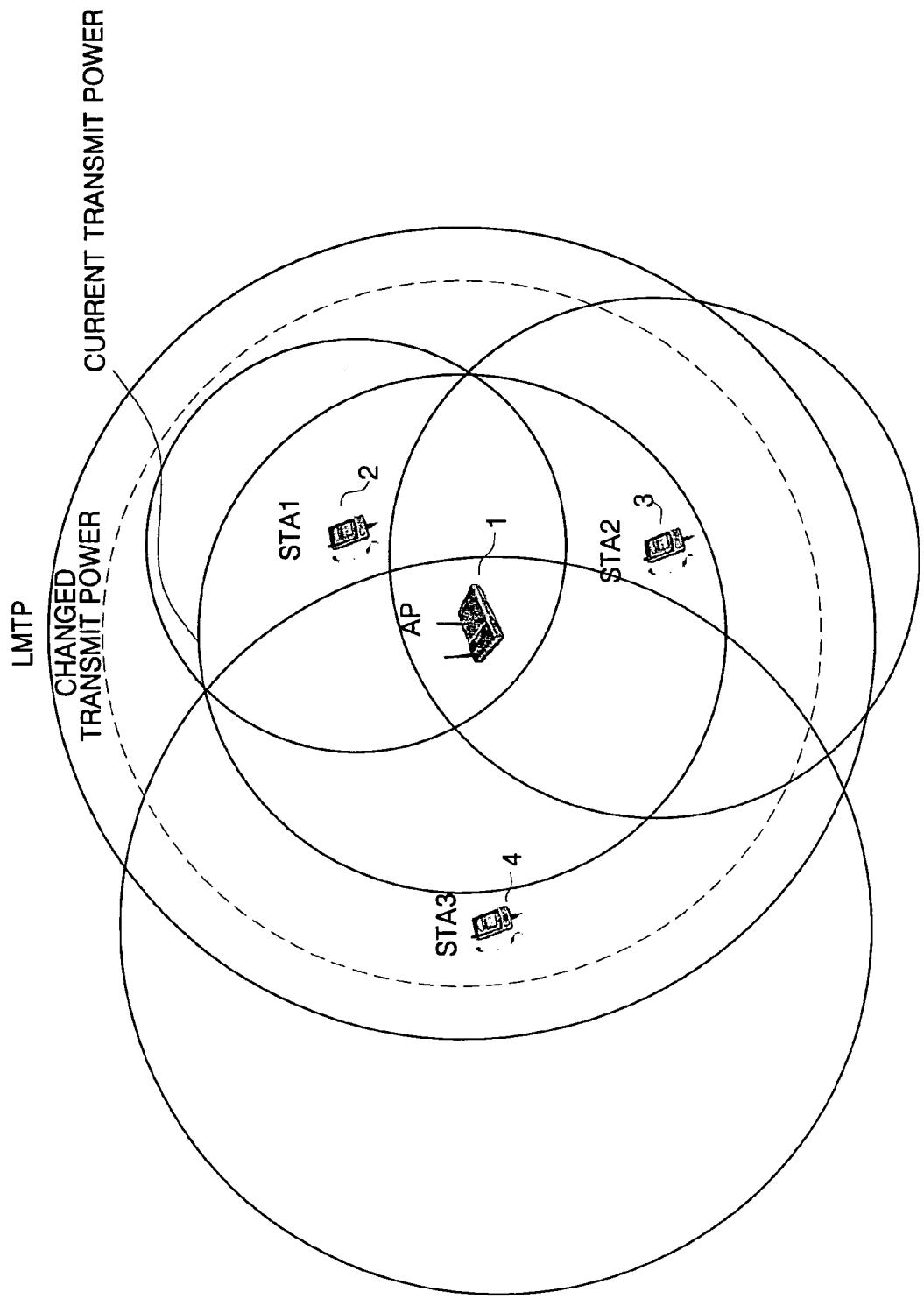
FIG. 6 is a diagram of a wireless LAN system based on transmit power control in accordance with an embodiment of the present invention.

FIG. 6 is a diagram of a wireless LAN system based on transmit power control in accordance with an embodiment of the present invention.

Referring to FIG. 6, the wireless LAN system based on transmit power control in accordance with an embodiment of the present invention comprises: an AP 1 which broadcasts a beacon frame to an area that is outside a service coverage of first transmit power using second transmit power, higher than the first transmit power already set when it reaches a set period, and which increases the first transmit power when there is a request for increase of the first transmit power based on the beacon frame broadcast by the second transmit power; and stations 2, 3 and 4 which request the increase of the first transmit power on the basis of the received beacon frame so as to make an association with the AP 1 when the beacon frame broadcast with the second transmit power is received from the AP 1 in the state that the stations 2, 3 and 4 are outside a service coverage of the first transmit power.

While the AP 1 communicates with a station STA1 2 and a station STA2 3 associated within the service coverage of current transmit power with currently set transmit power, the service coverage of the current transmit power is exceeded with transmit power higher than the current transmit power when the AP 1 reaches the set period and broadcasts the beacon frame having BSS information.

That is, the AP 1 broadcasts the beacon frame with the currently set transmit power every beacon period. Since the beacon frame broadcast from the AP 1 is transmitted to the stations STA1 2 and STA2 3 that are within the service coverage of the current transmit power, the AP 1 maintains the association with the stations STA1 2 and STA2 3 so as to perform communication with them. On the other hand, since station STA3 4 outside the service coverage of the current transmit power, it cannot receive the beacon frame broadcast from the AP 1, and thus station STA3 4 is in a state such that it does not associate with the AP 1 and it cannot communicate with the AP 1.

While the AP 1 broadcasts the beacon frame with the currently set transmit power every beacon period, it broadcasts the beacon frame with transmit power higher than the current transmit power when it reaches an arbitrarily set period. A beacon frame that is periodically broadcast with transmit power higher than the current transmit power is referred to as a strong beacon frame in order to distinguish it from the beacon frame transmitted with the current transmit power.

The strong beacon frame is broadcast with transmit power between service coverage of the current transmit power and that of LMTP. Transmit power that broadcasts the strong beacon frame may be set higher than the current transmit power and lower than the LMTP according to the user's selection. The transmit power that broadcasts the strong beacon frame is set as the transmit power of the LMTP for the sake of convenience.

When the station STA3 4, which is outside the service coverage of the current transmit power, receives the strong beacon frame broadcast with the transmit power of the LMTP, and requests an increase of the transmit power to make the association with the AP 1, the AP 1 calculates the channel loss power to the station STA3 4 using the transmit power information of the station STA3 4 as received from the station STA3 4.

The AP 1 increases the current transmit power after consideration of the calculated channel loss power and broadcasts the beacon frame with the increased transmit power (changed transmit power) every beacon period. In addition, it sets a link to the station STA3 4 so that the station STA3 4 can associate with the AP 1.

Since the stations STA1 2 and STA2 3 are within the coverage of the current transmit power, they receive the beacon frame broadcast from the AP 1 every beacon period, and they extract the BSS information from the beacon frame. In addition, the stations STA1 2 and STA2 3 set a link to the AP 1 on the basis of the extracted BSS information, and maintain an association state so that they perform communication with the AP 1.

Meanwhile, since the station STA3 4 is outside of the coverage of the current transmit power, it cannot receive the beacon frame broadcast from the AP 1 every beacon period, and cannot obtain the BSS information included in the beacon frame. Accordingly, the station STA3 4 cannot set a link to the AP 1, and it is in a state that it is not associated with the AP 1.

If the station STA3 4 receives the strong beacon frame broadcast with the transmit power of the LMTP from the AP 1, it performs tasks to extract the BSS information from the strong beacon frame, and it sets and associates a link to the AP 1 on the basis of the extracted BSS information.

In order to associate with the AP 1, the station STA3 4 extracts the BSS information from the strong beacon frame and calculates the channel loss power between the AP 1 and the station STA3 4. The station STA3 4 then decides its transmit power after consideration of the channel loss power and the transmit information as to its transmit power to the AP 1, so that an increase in the current transmit power is requested.

When the beacon frame is broadcast with a transmit power which is increased to the changed transmit power according to the increase request with respect to the current transmit power of the AP 1 that is requested by itself, a link is set by extracting the BSS information from the beacon frame, and the association is maintained so that communication is performed.

Figure 7:
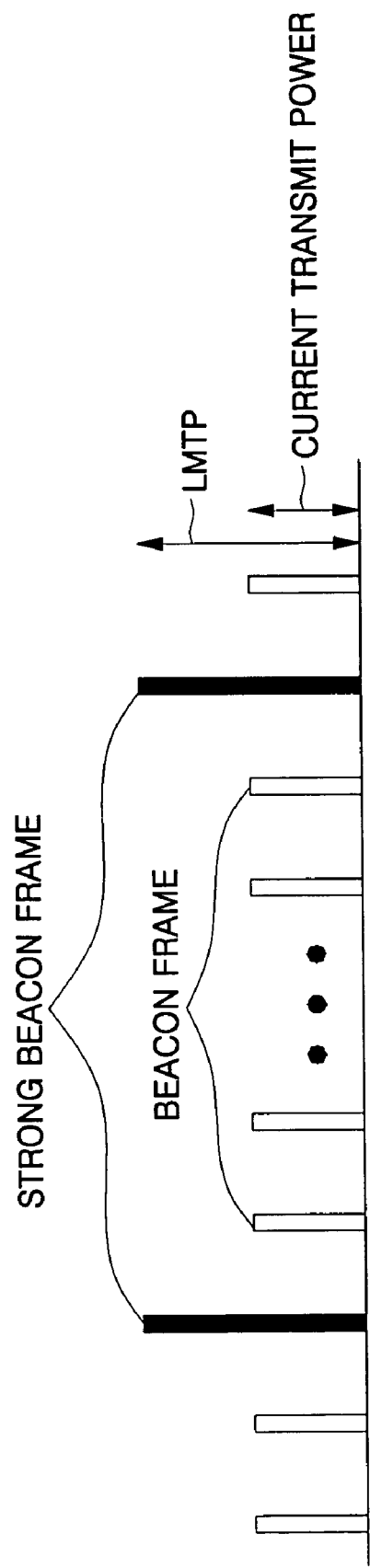
FIG. 7 is a diagram showing a strong beacon frame in accordance with the present invention.

FIG. 7 is a diagram showing a strong beacon frame in accordance with the present invention.

Referring to FIG. 7, the strong beacon frame is a beacon frame that has a predetermined period and is broadcast with power less than the local maximum transmit power (LMTP). The strong beacon frame also enables a station located far from the AP 1 to recognize the BSS information so that the station can perform an association with the AP 1. The predetermined period is an integer times the beacon period, and can be controlled by the user.

As shown in FIG. 7, the beacon frame broadcast with the current transmit power is broadcast within the service coverage of the current transmit power every beacon period. Then, when it reaches a set period, the strong beacon frame is broadcast with the transmit power of the LMTP, having a transmit power higher than the current transmit power. After the strong beacon frame is broadcast, the beacon frame is broadcast with the current transmit power every beacon period. In addition, the strong beacon frame is broadcast with the transmit power of the LMTP when a period to broadcast the strong beacon frame again occurs.

The strong beacon frame is transmitted outside the service coverage of the current transmit power, and is then broadcast to the service coverage of the LMTP. Accordingly, the stations within the service coverage of the LMTP can receive the strong beacon frame to be transmitted from the AP. In addition, each of the stations controls its transmit power on the basis of the BSS information by extracting the BSS information from the strong beacon frame, and transmits the controlled transmit power to the AP 1 so that the AP 1 is requested to increase its current transmit power.

At this point, the strong beacon frame has the same format as that shown in FIG. 3.

As shown in FIG. 3, with respect to the beacon frame proposed in the IEEE 802.11h/D3.0, it is determined whether there is a CFP interval in the CF Parameter Set (element number 8). In addition, it is possible to recognize an LMTP included in the current BSS from element numbers 11 and 14 and the transmit power of the current AP from the TPC Report (element number 18). The LMTP can be controlled using the Power Constraint (element number 14).

However, since the transmit power transmitted from the AP 1 is not the current transmit power, but rather the transmit power of the LMTP, the transmit power set in the TPC Report (element 18) is set as that of LMTP.

Referring to FIG. 6, if the transmit power of the beacon frame broadcast from the AP 1 is the current transmit power, the station STA3 4 is in a state wherein it is not associated with the AP 1 since the station STA3 4 cannot receive the beacon frame. In addition, if the transmit power broadcast from the AP 1 is set as the LMTP, and the strong beacon frame is received, the station STA3 4 recognizes the BSS information after receiving the strong beacon, and performs synchronization with a system within the BSS for the first time.

In this procedure, the station STA3 4 determines whether the CFP interval is set from a CF Parameter Set (element number 9) of the strong beacon frame received by the station STA3 4. When the CFP interval was set as a result of the determination, the station STA3 4 stands by for the CFP interval without trying to establish communication. Then, the station STA3 4 enables the AP 1 to perform the PCF by trying to make a connection after the CFP interval so that Quality of Service (QoS) communication is guaranteed.

If the CFP interval was not set as a result of the determination, the station STA3 4 tries to connect to the AP 1 after receiving the strong beacon.

In addition, when the station STA3 4 receives the strong beacon frame from the AP 1, it calculates the power that the station STA3 4 can transmit to the AP 1 from the TPC Report (element 18) of the strong beacon frame. Since it is possible to calculate the channel path loss from the AP 1 to the station STA3 4, the power that is transmitted by the station STA3 4 is determined as follows:

Transmit power of the *STA3*=Quantity of the channel path loss+Minimum reception power required for the data rate of frame to be received by the *AP*

When the station STA3 4 determines the transmit power that it transmits to the AP 1, it includes the decided transmit power in the associative TPC report frame, and transmits the power.

The associative TPC report frame is a frame that requests the AP 1 to increase the transmit power in order to enable the station STA3 4, which is outside of the service coverage of the current transmit power, to associate with the AP 1.

Figures 8, 9:
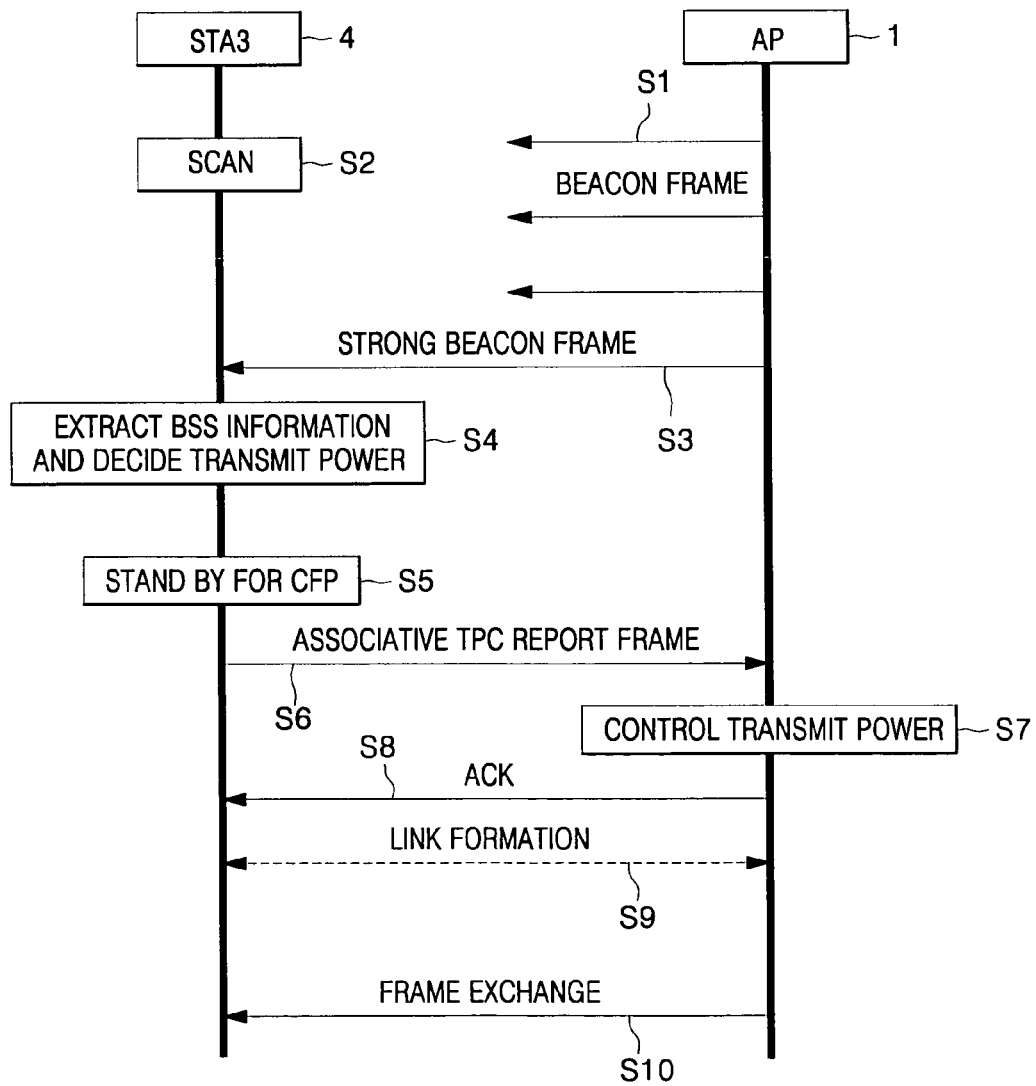
FIG. 8 is a diagram of an associative TPC report frame in accordance with an embodiment of the present invention.
FIG. 9 is a flowchart showing a method for controlling transmit power in a wireless LAN system based on transmit power control in accordance with the present invention.

FIG. 8 is a diagram of an associative TPC report frame in accordance with an embodiment of the present invention.

Referring to FIG. 8, the associative TPC report frame in accordance with the present invention includes a Category field, an Action field, and a TPC Report Element field.

At this point, a value with which the corresponding frame displays the associative TPC report frame is set in the Action field.

Meanwhile, the associative TPC report frame shown in FIG. 8 is different from the TPC report frame shown in FIG. 4. In FIG. 4, the TPC report frame is used to control an interior power state of the BSS in response to the station with respect to the TPC request frame that is transmitted by the AP 1. Accordingly, the TPC report frame needs a Dialog Token which is used to inform the TPC report frame according to the TPC request frame that the AP 1 sends to each station.

On the other hand, since the associative TPC report frame shown in FIG. 8 is not a frame used to respond to the request of the AP 1, but rather is a frame used to request the AP 1 to update the transmit power of the AP 1 by increasing the transmit power of the AP 1 in the BSS in order to associate with the AP 1 in a state wherein the station is outside the service coverage of the current transmit power of the AP 1, the Dialog Token to accomplish synchronization is not needed.

In the action frame proposed in the IEEE 802.11h, the action field value is defined from 0 to 4 according to the contents of the frame, and 5 to 255 are held in reserve. Accordingly, the associative TPC report frame in accordance with the present invention can be different from the other existing action frames by selecting and using one of the reserved action field values, and the method for discriminating the associative TPC report frame from the existing frame and processing it by the AP 1 is as follows.

When the AP 1 receives an arbitrary frame from an arbitrary station, it reads a category field and an action field of the frame sequentially. At this point, when the action field value is set to the values of 0 to 4, this identifies it as an existing frame structure and the dialog token field is read. Meanwhile, when the action field value is set as a promised value to display an associative TPC report frame type, the AP 1 identifies the corresponding frame as an associative TPC report frame, and then a frame structure without the dialog token field, and reads the TPC report element of the next field.

The AP 1 that receives the associative TPC report frame from the station STA3 4 obtains transmit power information to be used by the AP 1 from the TPC report element. The AP 1 receives the associative TPC report frame from the station STA3 4, and updates its current transmit power to an increased transmit power on the basis of the associative TPC report frame so that the station STA3 4 can receive the frame transmitted by the AP 1. Simultaneously, the AP 1 informs the station STA3 4 as to whether the associative TPC report frame is received by transmitting an ACK frame to the station STA3 4. Accordingly, the station STA3 4 recognizes that a link to communicate with the AP 1 was formed by receiving the ACK frame transmitted from the AP 1.

Then, since the AP 1 can exchange the frame with the station STA3 4 in the BSS, authentication and association procedures can be performed.

FIG. 9 is a flowchart showing a method for controlling transmit power in a wireless LAN system based on transmit power control in accordance with the present invention.

Referring to FIG. 9, the AP 1 broadcasts the beacon frame with currently set transmit power every beacon period (S1). At this point, the beacon frame broadcast from the AP 1 is transmitted to the stations STA1 2 and STA2 3, which are inside the service coverage of the current transmit power, and the station STA3 4, which is outside the service coverage of the current transmit power, does not receive the beacon frame broadcast from the AP 1.

Meanwhile, even though the station STA3 4 is outside the service coverage of the current transmit power and does not associate with the AP 1, it performs an operation of scanning a frequency continuously (S2).

The AP 1 broadcasts the beacon frame with the currently set transmit power every beacon period, and it broadcasts the strong beacon frame with the transmit power of the LMTP higher than the current transmit power when it reaches a period to broadcast the strong beacon frame (S3).

When the station STA3 4 receives the strong beacon frame broadcast from the AP 1 while performing the scan task continuously, it determines whether the CFP interval is set from CF Parameter Set (element number 9) of the strong beacon frame which it has received. Simultaneously, the station STA3 4 calculates the power that the station STA3 4 transmits to the AP 1 from the TPC report element of the strong beacon frame received from the AP 1, and decides its transmit power (S4).

When the CFP interval is set as a result of determining whether the CFP interval is set in the strong beacon frame received from the AP 1, the station STA3 4 stands by for the CFP interval without trying to establish communication (S5), and then requests an increase in the transmit power of the AP 1 by transmitting the associative TPC report frame to the AP 1 after the CFP interval (S6).

If the station STA3 4 requests an increase in the transmit power in order to make an association of the AP 1 through the associative TPC report frame, the AP 1 calculates the channel loss power to the station STA3 4 using transmit power information of the station STA3 4 received from the station STA3 4, increases the current transmit power in consideration of the calculated channel loss power (S7), and transmits an acknowledge signal ACK to the station STA3 4 (S8). Then, the AP 1 broadcasts the beacon frame with the increased transmit power (changed transmit power) every beacon period, and the station STA3 4 receives the beacon frame and sets a link to the AP 1 (S9). When the link between the AP 1 and the station STA3 4 is set, the frame is exchanged through the set link and communication is performed (S10).

According to the present invention, an AP periodically transmits a strong beacon frame having Local Maximum Transmit Power (LMTP) and then transmits information of a BSS to a station existing outside the transmit power coverage of the current AP so that the station can make a new association.

In addition, the strong beacon frame reduces electronic wave interference with respect to another BSS by not using the maximum power to be used by the AP, but rather by using power having a level which is less than that of the LMTP. A station that secures the information of the BSS can protect communication, which should guarantee QoS since it does not approach the BSS for a CPF interval when the station approaches the AP.

Furthermore, the station provides the AP with power information in the current position and updates transmit power information so as to enable the AP to communicate with a newly approaching station. Therefore, a basis is provided for the newly approaching station to associate and communicate with the BSS with ease.

Finally, a method for controlling the transmit power is provided in accordance with the present invention, and the inventive method guarantees backward compatibility with IEEE 802.11 and IEEE 802.11h.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. A wireless local area network (LAN) system based on transmit power control, comprising:
   an access point (AP) for broadcasting a beacon frame to an area that is outside a service coverage of a first transmit power by using a second transmit power which is higher than the first transmit power and which is already set when a set period is reached, and for increasing the first transmit power when there is an increase request to increase the first transmit power based on the beacon frame broadcast with the second transmit power; and
   a station for requesting an increase in the first transmit power on the basis of the beacon frame broadcast with the second transmit power to make an association with the AP when the station receives the beacon frame broadcast from the AP with the second transmit power when the station is outside the service coverage of the first transmit power.

2. The system according to claim 1, wherein the access point (AP) performs link setting according to an association request of a corresponding station with increased first transmit power.

3. The system according to claim 1, wherein the set period has a period that is an integer times a beacon period.

4. The system according to claim 1, wherein the access point (AP) receives transmit power information of a corresponding station from the station that is outside the service coverage of the first transmit power, calculates a loss power of a channel from the transmit power information, calculates changed power in which a minimum reception power required for a data rate of a frame to be received by the station is added to the channel loss power, and increases the first transmit power to the calculated changed power.

5. The system according to claim 4, wherein the loss power of the channel is calculated by extracting the transmit power of the station from the transmit power information received from the station, and then comparing the extracted transmit power to reception power that is actually received from the station.

6. The system according to claim 1, wherein the second transmit power is set to a value lower than local maximum transmit power (LMTP).

7. The system according to claim 1, wherein the first transmit power may be increased to a maximum local maximum transmit power (LMTP).

8. The system according to claim 1, wherein the station forms a link to the access point (AP) which transmits a frame with the increased first transmit power to perform a new association with the AP.

9. The system according to claim 1, wherein the station calculates path loss power of a channel from the received beacon frame broadcast with the second transmit power, adds a minimum reception power required for a data rate of the frame to be received by the access point (AP) to the calculated path loss power, and transmits calculated transmit power information to the AP.

10. The system according to claim 9, wherein the path loss power of the channel is calculated by extracting second transmit power information of the access point (AP) from the received beacon frame, and comparing the second transmit power information to the reception power that is actually received from the AP.

11. The system according to claim 1, wherein the station extracts Contention-Free Period (CFP) interval information from the received beacon frame and tries to make a connection after standing by for a CFP interval when the CFP interval is set.

12. The system according to claim 1, wherein the station transmits an associative transmit power control (TPC) frame including information to require an increase of the first transmit power for the association with the AP.

13. The system according to claim 12, wherein the associative TPC frame includes a category field, an action field, and a TPC report element field.

14. The system according to claim 13, wherein the associative TPC frame sets a value to indicate that a frame type is an associative TPC report frame in the action field.

15. A method for controlling transmit power of an access point (AP), comprising the steps of:
   broadcasting from the access point (AP), a beacon frame to an area that is outside a service coverage of a first transmit power by using a second transmit power, higher than the first transmit power, already set when it reaches a set period; and
   increasing the first transmit power at the AP when at least one station in the area that is outside the service coverage of the first transmit power receives the beacon frame broadcast by the second transmit power and requests an increase in the first transmit power in order to make an association with the AP.

16. The method according to claim 15, wherein the set period has a period that is an integer times a beacon period.

17. The method according to claim 15, further comprising the step of allowing the access point (AP) to perform link setting according to an association request of a corresponding station with increased first transmit power.

18. The method according to claim 15, wherein the step of increasing the first transmit power includes the sub-steps of:
   receiving transmit power information of a corresponding station from the station that is outside the service coverage of the first transmit power;
   calculating a loss power of a channel from the transmit power information;
   calculating changed power in which a minimum reception power required for a data rate of the frame to be received by the station is added to the channel loss power; and
   increasing the first transmit power to the calculated changed power.

19. The method according to claim 18, wherein the loss power of the channel is calculated by extracting transmit power of the station from the transmit power information received from the station, and then comparing the extracted transmit power to reception power that is actually received from the station.

20. The method according to claim 15, wherein the second transmit power is set lower than local maximum transmit power (LMTP).

21. The method according to claim 15, wherein the first transmit power can be increased to a maximum local maximum transmit power (LMTP).

22. A method for controlling transmit power of a station in a wireless local area network (LAN) system, comprising the steps of:
   requesting, from the station to an access point (AP), an increase in a first transmit power on the basis of a beacon frame received from the AP, when the beacon frame broadcast with a second transmit power, higher than the first transmit power, is received from the AP when the station does not associate with the AP and the station is disposed outside a service coverage of the first transmit power of the AP; and
   forming a link from the station to the AP that transmits the frame with the increased first transmit power, and performing a new association with the AP.

23. The method according to claim 22, wherein the step of requesting the increase includes the sub-steps of:
   calculating, at the station, a path loss power of a channel based upon the received beacon frame; and
   adding minimum reception power required for a data rate of the frame to be received by the access point (AP) to the calculated path loss power at the station, and transmitting calculated transmit power information from the station to the AP.

24. The method according to claim 23, wherein the path loss power of the channel is calculated by extracting second transmit power information of the access point (AP) from the received beacon frame and comparing the extracted second transmit power information to received power that is actually received from the AP.

25. The method according to claim 22, wherein the station extracts contention-free period (CFP) interval information from the received beacon frame, and tries a connection after standing by for a CFP interval when the CFP interval is set in the extracted CFP interval information.

26. The method according to claim 25, wherein the connection is tried immediately after the beacon frame is received when the contention-free period (CFP) interval has not been set in the extracted CFP interval information.

27. A wireless local area network (LAN) system based on transmit power control, comprising:
   an access point (AP) for transmitting basic service set (BSS) information to an area that is outside a service coverage of a first transmit power by using a second transmit power which is higher than the first transmit power and which is already set, when a set period is reached, and for increasing the first transmit power when there is an increase request to increase the first transmit power based on the BSS information transmitted with the second transmit power; and
   a station for requesting the increase of the first transmit power on the basis of the received BSS information so as to make an association with the AP when receiving the BSS information transmitted from the AP with the second transmit power when the station receiving the BSS information is outside the service coverage of the first transmit power.

28. A method for controlling transmit power of an access point (AP), comprising the steps of:
   transmitting basic service set (BSS) information to an area that is outside a service coverage of a first transmit power by using a second transmit power which is higher than the first transmit power and which is already set when a set period is reached; and
   increasing the first transmit power at the AP when at least one station that is outside the service coverage of the first transmit power receives the BSS information transmitted by the second transmit power and requests an increase of the first transmit power in order to make an association with the AP.

29. A method for controlling transmit power of a station in a wireless local area network (LAN) system based on transmit power control, comprising the steps of:
   requesting, from the station to an access point (AP) an increase of a first transmit power on the basis of basic service set (BSS) information received from the AP in order to make an association with the access point (AP) when the station receives the BSS information transmitted with a second transmit power higher than the first transmit power, from the AP when the station is outside a service coverage of the first transmit power of the AP and is not associated with the AP; and
   forming a link from the station to the AP that transmits a frame with increased first transmit power, and performing a new association at the station with the AP.

* * * * *